March 12, 1935.         C. E. LINSCOTT         1,994,317
RUBBER ARTICLE AND PROCESS OF MAKING THE SAME Filed July 15, 1933

Inventor
CHESTER E. LINSCOTT
By
Attorney

Patented Mar. 12, 1935

1,994,317

UNITED STATES PATENT OFFICE 1,994,317

RUBBER ARTICLE AND PROCESS OF MAKING THE SAME

Chester E. Linscott, Saugus, Mass., assignor, by mesne assignments, to United States Rubber Company, New York, N. Y., a corporation of New Jersey Application July 15, 1933, Serial No. 680,563

5 Claims. (Cl. 18—58)

This invention relates to manufacture of rubber articles, and more particularly to the manufacture of rubber articles directly from an aqueous dispersion of rubber by depositing rubber from such a dispersion by a dipping, spraying, or spreading operation onto a deposition backing having a rubber surface.

In the manufacture of rubber articles by coating forms of the desired shape with an aqueous dispersion of rubber and drying or otherwise coagulating the latex on the form and then removing the thus formed article, it has been common practice to utilize forms of metal, glazed or unglazed clay, or porcelain, wood, or glass. In the deposition of latex on a deposition backing, such as on a belt by spreading operations, it has been suggested to use a metal belt due to the slight adhesion of a freshly formed rubber film deposited directly from latex to a metal surface. It has been suggested to use rubber forms or deposition backings for the deposit of rubber directly from an aqueous dispersion of rubber, but it has been found that both vulcanized and unvulcanized rubber surfaces are far too adherent to freshly deposited and coagulated latex films to provide a satisfactory deposition surface from which the coagulated deposit may be stripped readily.

The present invention relates to the production of a deposition backing having a deposition surface of rubber which is substantially non-adherent to a rubber film deposited from latex thereon and from which surface such a rubber film may easily be removed. It also relates to the production of rubber articles by the deposition of rubber from aqueous dispersions thereof upon such deposition backings.

Figure 1:
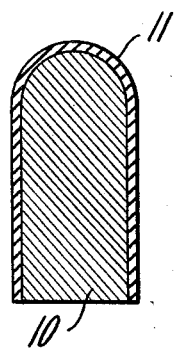
Fig. 1 is a cross-section of a dipping form of metal coated with a rubber composition for the deposition surface according to the present invention.

In carrying out the present invention, the deposition backing is provided with a surface of a rubber composition treated as disclosed hereinafter. The entire deposition backing, if desired, may be of rubber and may be either solid or hollow and expansible; or it may comprise a support made of some other material such as metal, wood, glass or the like and coated with a rubber composition. The deposition backing may be of fabric material, as for example in a backing for producing rubber sheeting from latex, said fabric having a coating thereon of rubber.

In order to condition the rubber surface of the deposition backing for use in the process of my invention, said rubber surface is treated so as to provide a non-adhering surface from which a rubber layer deposited thereon from latex may easily be removed. I have found that ordinary unvulcanized or vulcanized rubber compositions, whether molded, calendered, or made from rubber cement or from latex, do not provide a satisfactory surface from which such a rubber deposit may readily be removed. Various methods of treating the rubber surface to provide the desired characteristics may be employed. I have found that superficially treating the rubber surface with a halogenating material, such as sulphur chloride and bromide, or bromine preferably in dilute solution in an organic solvent such as carbon tetrachloride, provides the desired non-adhering rubber surface on the deposition backing. Chlorine may also be used in place of bromine. Another method of treating the rubber surface is to treat it with a heavy metal soap and a halogen material, exemplified by coating the rubber with zinc stearate, followed by treatment with a strong solution of sulphur chloride such as a solution thereof of at least 15% concentration in carbon tetrachloride; or, alternatively, a mixture of the soap and sulphur chloride may be applied to the rubber surface, to impart the desired non-adherent characteristics thereto. Another method of treating the rubber surface is to allow it to contact with concentrated sulphuric acid for a short period of time, washing with water and/or aqueous alkali, if desired, and drying. Still another method of providing the desired surface on the deposition backing is to treat the surface with an aqueous solution of an oxidizing agent such as a halogen, dichromate, chromic acid, oxychloride, hypochlorite, permanganate or the like for a short period of time, and then washing and drying.

The rubber of the deposition backing may be an ordinary calendered or otherwise masticated rubber composition of the desired shape, or it may be a rubber composition deposited from a solvent cement or from an aqueous dispersion of rubber, and it may be a so-called artificial or synthetic rubber or rubber-like material. The rubber of the deposition backing may be unvulcanized or vulcanized. If the rubber deposition surface is unvulcanized, it may be vulcanized after the treatment to produce a surface non-adherent to rubber deposited thereon. It has been found that after such subsequent vulcanization the deposition surface retains the desirable non-adhesive properties imparted to it by the surface treatment. It is preferable, however, to first vulcanize the rubber composition of the deposition backing and then to superficially treat the deposition surface to produce the desired effect. The treatment to render the rubber surface of the deposition backing non-adherent to rubber subsequently deposited thereon, is permanent in its effect, hence the treatment need not be repeated following successive depositions of rubber thereon.

In treating the rubber deposition surface to provide a surface non-adhesive to a rubber deposit by the halogen-solvent treatment above described, the surface is treated preferably first with a solution of sulphur chloride in organic solvent, for example a 1% solution of sulphur chloride in carbon tetrachloride, and then with a solution of bromine in organic solvent, for example, a 2% solution of bromine in carbon tetrachloride. The surface is allowed to contact with the sulphur chloride and bromine solutions only for a very short period of time, normally for less than a minute each, and preferably for only a few seconds. A satisfactory treatment of the surface may also be obtained by treating with bromine, preferably in carbon tetrachloride solution, or the deposition surface may be treated with a solution containing both sulphur chloride and bromine. The surface may be first shellacked or varnished and the thus treated surface halogenated. The concentration of the solutions may be varied as desired and the material is dried after such halogenating treatment.

The treatment of the rubber surface with concentrated sulphuric acid as above described, is effected preferably with commercial concentrated sulphuric acid of 66° Baumé by treatment for a period of from about ten seconds to one or two minutes and then terminating the action of the acid by washing in water and/or aqueous alkali and drying.

In treating the rubber deposition surface with an aqueous solution of an oxidizing agent, the solutions may be of various concentrations depending on the oxidizing agent selected, and the time of treatment may vary. For example, the surface may be treated with a saturated aqueous solution of chlorine or bromine for 10 to 15 minutes, or with a neutral saturated aqueous potassium dichromate solution for about an hour. Treatment with a 2% bleaching powder solution for about an hour or a 2% sodium hypochlorite solution treatment for 10 to 15 minutes also is effective. More concentrated solutions are effective in shorter periods of time. For example a 10% sodium hypochlorite solution produces the desired result in about a minute. After treatment with an oxidizing agent for the desired period of time, the surface is washed free of reagent, and dried.

Referring more particularly to the drawing, Fig. 1 shows a conventional dipping form composed mainly of metal 10, with a coating 11 on the outside of the form of a vulcanized rubber composition deposited from latex and treated according to the present invention to produce the desired surface.

Figure 2:
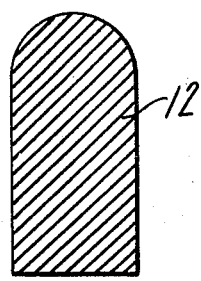
Fig. 2 is a cross section of a dipping form composed entirely of rubber.

Fig. 2 illustrates a conventional dipping form similar to Fig. 1 but composed entirely of rubber material 12. In this case the form is preferably made of ordinary rubber composition molded to shape and vulcanized, and subsequently surface-treated to provide a surface non-adhering to rubber deposited thereon.

Figure 3:
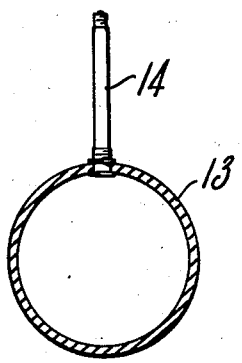
Fig. 3 illustrates an expanded hollow rubber form.

Fig. 3 illustrates a hollow dipping form composed of calendered sheet rubber 13 suitably seamed to provide the desired shape of dipping form and surface-treated according to the present invention. A balloon form is illustrated and the rubber dipping form is provided with a metal stem portion 14 for inflating the form 13 before dipping. In practice the form 13, whose surface has been treated with a carbon tetrachloride solution of bromine in order to provide a non-adhering surface, is inflated and is then dipped into a latex composition to the desired distance above the stem 14, and is then removed from the latex. The latex adhering to the form is preferably coagulated by treatment with an acid or other agglomerating or coagulating agent, for example, by dipping the form into an acid bath, and then the thus treated form is again dipped into latex to provide a film of the desired thickness thereon. After the second dipping treatment the latex adhering to the surface of the form is dried, and the form is then deflated and the deflated form 13 extracted from the balloon thus produced through that portion of the nipple of the balloon corresponding to the portion of the stem 14 which dipped below the surface of the latex. In dipping procedure the form may first be dipped into a coagulant and then into latex, and dried. The untreated form may be dipped in latex and dried, and the dipping and drying operations repeated until the desired thickness of article has been obtained. The various dipping procedures as practiced in the art may obviously be utilized.

Figure 4:
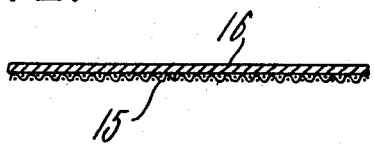
Fig. 4 shows a portion of a deposition backing in sheet form composed of a fabric base coated with a rubber deposition surface.

Fig. 4 illustrates a deposition backing for the production of rubber sheeting directly from latex and comprises a fabric base 15 coated with a rubber coating 16, either calendered on or deposited on the fabric from a rubber cement or from an aqueous dispersion of rubber. The rubber coating 16 which provides the deposition surface of the backing material is surface-treated, preferably after vulcanization as above described, to produce a surface non-adherent to a dried latex composition deposited thereon.

Rubber is deposited from an aqueous dispersion of rubber, such as latex, on the treated rubber surface of the deposition backing in a manner well known in the art, such as by dipping and drying, or by spreading and drying, or by spraying, or by treatment with latex and coagulant and subsequent drying, and the dried rubber deposit is removed from the deposition backing. If it is desired to vulcanize the rubber article, the same may be vulcanized on the backing or it may be removed from the backing and subsequently vulcanized. With rubber articles of a thickness greater than about .005 inch, it is preferable to remove the same from the deposition backing prior to vulcanization, while with articles of a thickness of about .005 inch or less, it is preferable to vulcanize the same on the backing, or at least partially vulcanize the same on the backing and then remove the same and complete the vulcanization, if necessary. If desired, the rubber dispersion from which the articles are made may be a vulcanized latex.

Any of the forms or deposition backings treated according to the invention may also be provided with suitable designs, embossed or engraved or otherwise produced thereon, whereby to reproduce similar designs in the articles subsequently formed on the form or backing.

While the invention has been described more or less in detail, it is not intended thereby to so limit the invention inasmuch as the examples herein set forth are merely illustrative thereof, and various modifications may be made without departing from the invention, the scope of which is indicated in the following claims.

Having thus described my invention, what I claim and desire to protect by Letters Patent is:

1. The process of producing a rubber article which comprises depositing rubber from an aqueous dispersion of rubber on a deposition backing having at least the deposition surface thereof comprising a rubber composition treated to provide a surface non-adhering to rubber deposited thereon, solidifying the rubber deposit, and removing the rubber article from the deposition backing.

2. The process of producing a rubber article which comprises depositing rubber from an aqueous dispersion of rubber on a deposition backing having at least the deposition surface thereof comprising a rubber composition at least surface-halogenated to provide a surface non-adhering to rubber deposited thereon, solidifying the rubber deposit, and removing the rubber article from the deposition backing.

3. The process of producing a rubber article which comprises depositing rubber from an aqueous dispersion of rubber on a deposition backing having at least the deposition surface thereof comprising a rubber composition at least surface-treated with sulphur chloride and bromine to provide a surface non-adhering to rubber deposited thereon, solidifying the rubber deposit, and removing the rubber article from the deposition backing.

4. The process of producing a rubber article which comprises depositing rubber from an aqueous dispersion of rubber on a deposition backing having at least the deposition surface thereof comprising a rubber composition at least surface-treated with concentrated sulphuric acid to provide a surface non-adhering to rubber deposited thereon, solidifying the rubber deposit, and removing the rubber article from the deposition backing.

5. The process of producing a rubber article which comprises depositing rubber from an aqueous dispersion of rubber on a deposition backing having at least the deposition surface thereof comprising a rubber composition at least surface-treated with an aqueous solution of an oxidizing agent to provide a surface non-adhering to rubber deposited thereon, solidifying the rubber deposit, and removing the rubber article from the deposition backing.

CHESTER E. LINSCOTT.